(12) United States Patent
Suzuki et al.

(10) Patent No.: US 12,345,286 B2
(45) Date of Patent: Jul. 1, 2025

(54) MAGNET HOLDER AND MAGNET UNIT

(71) Applicant: NTN Corporation, Osaka (JP)

(72) Inventors: Shouhei Suzuki, Aichi (JP); Toshihiro Takakusu, Mie (JP); Daisuke Takeda, Aichi (JP)

(73) Assignee: NTN CORPORATION, Osaka (JP)

( * ) Notice: Subject to any disclaimer, the term of this patent is extended or adjusted under 35 U.S.C. 154(b) by 450 days.

(21) Appl. No.: 17/425,050

(22) PCT Filed: Feb. 7, 2020

(86) PCT No.: PCT/JP2020/004839
§ 371 (c)(1),
(2) Date: Jul. 22, 2021

(87) PCT Pub. No.: WO2020/170859
PCT Pub. Date: Aug. 27, 2020

(65) Prior Publication Data
US 2022/0099118 A1 Mar. 31, 2022

(30) Foreign Application Priority Data

Feb. 20, 2019 (JP) .................................. 2019-028339
Sep. 30, 2019 (JP) .................................. 2019-179401

(51) Int. Cl.
*G01D 5/12* (2006.01)
*F16B 4/00* (2006.01)
*F16D 1/072* (2006.01)

(52) U.S. Cl.
CPC .............. *F16B 4/004* (2013.01); *F16D 1/072* (2013.01); *G01D 5/12* (2013.01); *Y10T 403/473* (2015.01)

(58) Field of Classification Search
CPC ....... G01D 5/12; Y10T 403/473; F16B 4/004; F16D 1/064; F16D 1/072
See application file for complete search history.

(56) References Cited

U.S. PATENT DOCUMENTS 9,360,295 B2 * 6/2016 Taniguchi .............. G01D 11/30
2012/0176126 A1 7/2012 Naganuma et al.
(Continued)

FOREIGN PATENT DOCUMENTS

EP 3 023 746 5/2016
GB 1 304 143 * 1/1973 ............. B25K 25/00
(Continued)

OTHER PUBLICATIONS

International Search Report issued Apr. 14, 2020 in International (PCT) Application No. PCT/JP2020/004839.
(Continued)

*Primary Examiner* — Michael P Ferguson
(74) *Attorney, Agent, or Firm* — Wenderoth, Lind & Ponack, L.L.P.

(57) ABSTRACT

In a magnet holder 4 including: a shaft attachment portion 41 to which a shaft 2 is press-fitted and fixed; and a magnet holding portion 42 that is provided on one side in an axial direction of the shaft attachment portion 41 and holds a periphery of a magnet 5, and provided with an undercut portion 50 that engages with the magnet 5 in the axial direction on an inner peripheral surface 43 of the magnet holding portion 42 facing the magnet 5, the magnet holding portion 42 and the shaft attachment portion 41 are integrally formed of sintered metal, an outer peripheral surface and an end surface of the magnet holding portion 42 and an inner peripheral surface of the shaft attachment portion 41 are sized, and the undercut portion 50 is formed by plastic deformation of the magnet holding portion 42.

5 Claims, 15 Drawing Sheets

(56) References Cited

U.S. PATENT DOCUMENTS

2014/0070799 A1    3/2014  Taniguchi et al.
2016/0146630 A1*  5/2016  Takahashi ................ G01D 5/14
                                                                     324/207.25

FOREIGN PATENT DOCUMENTS

| JP | 7-332363 | 12/1995 | | |
|---|---|---|---|---|
| JP | 2001-241444 | 9/2001 | | |
| JP | 5141780 | 2/2013 | | |
| JP | 2014-057431 | 3/2014 | | |
| JP | 2016-205977 | 12/2016 | | |
| JP | 2017-173035 | 9/2017 | | |
| WO | WO 2009/106390 | * | 9/2009 | ............. B21K 25/00 |

OTHER PUBLICATIONS

English translation of the International Preliminary Report on Patentability and Written Opinion of the International Searching Authority issued Aug. 10, 2021 in International (PCT) Application No. PCT/JP2020/004839.
Extended European Search Report issued Aug. 16, 2022 in corresponding European Patent Application No. 20758793.2.

* cited by examiner

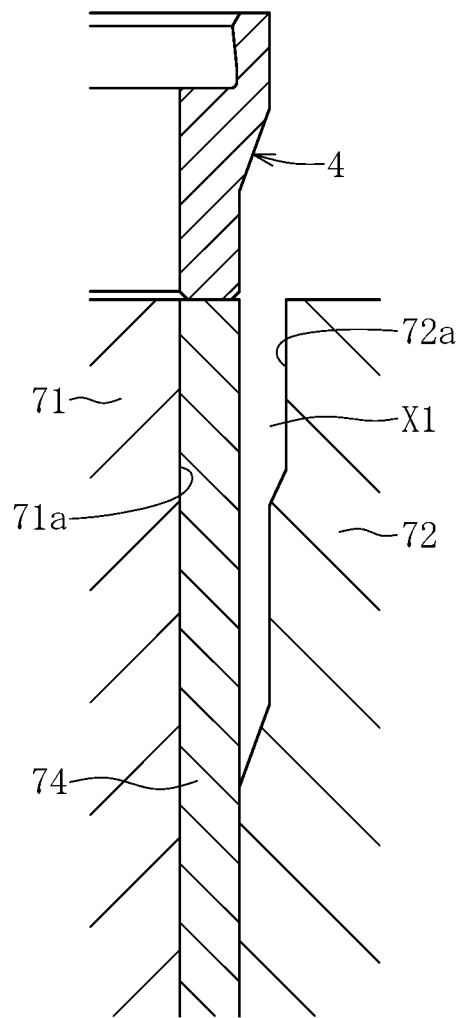

MAGNET HOLDER AND MAGNET UNIT

TECHNICAL FIELD

The present invention relates to a magnet holder and a magnet unit including the magnet holder.

BACKGROUND ART

Some rotation angle detection devices for detecting a rotation angle of a rotating body detect the rotation angle by detecting a change in a magnetic field formed by a magnet that rotates integrally with the rotating body using a magnetic sensor, and for example, this type of rotation angle detection device is provided for detecting a rotation angle of an electric motor mounted on a power steering device of an automobile.

The rotation angle detection device is provided with the magnet and the magnet holder for holding the magnet. For example, Patent Literature 1 describes a rotation angle detection device having a configuration in which a holder member attached to one end side in an axial direction of the rotating body holds the magnet on a side opposite to a side attached to a rotating shaft in the axial direction. In this device, when the holder member and the magnet rotate integrally with a rotation shaft due to rotation of the rotation shaft, the magnetic sensor provided to face the magnet can detect the change in the magnetic field and detect the rotation angle of the rotation shaft.

In the device as described above, a retaining mechanism is generally provided in order to prevent the magnet from falling off the holder member. For example, in Patent Literature 2, as illustrated in FIG. 10, a cylindrical holder member 101 is provided, and the magnet member 102 is integrally molded with a recess 101a that is provided on an inner peripheral surface side of the holder member 101 and opens to one end side in the axial direction. An inner peripheral wall of the holder member 101 forming the recess 101a is an undercut portion 101b having a diameter increasing from one side to the other side in the axial direction. The magnet member 102 is locked by the undercut portion 101b, and the magnet member 102 can be prevented from falling off the opening on the one side in the axial direction of the holder member 101.

CITATIONS LIST

Patent Literature

Patent Literature 1: Japanese Patent No. 5141780
Patent Literature 2: Japanese Patent Application Laid-Open No. 2016-205977

SUMMARY OF INVENTION

Technical Problems

It is difficult to integrally mold an undercut shape as in Patent Literature 2 when the holder member is molded by die molding. Therefore, for example, Patent Literature 2 discloses that the undercut portion 101b is formed by machining such as lathe machining. However, such a post-processing method has a problem that the number of steps increases, leading to an increase in manufacturing cost.

In view of such circumstances, an object of the present invention is to manufacture a magnet holder having a magnet retaining mechanism at low cost.

Solutions to Problems

In order to solve the above problems, the present invention is a magnet holder including: a shaft attachment portion to which a shaft is press-fitted and fixed; and a magnet holding portion that is provided on one side in an axial direction of the shaft attachment portion and holds a periphery of a magnet, and provided with an undercut portion that engages with the magnet in the axial direction on an inner surface of the magnet holding portion facing the magnet, in which the magnet holding portion and the shaft attachment portion are integrally formed of sintered metal, an outer peripheral surface and an end surface of the magnet holding portion and an inner peripheral surface of the shaft attachment portion are sized, and the undercut portion is formed by plastic deformation of the magnet holding portion.

The sintered metal is rich in plastic fluidity, so that high surface accuracy can be obtained by sizing. Therefore, as in the above-described configuration of the present invention, by integrally forming the magnet holding portion and the shaft attachment portion with sintered metal and sizing the inner peripheral surface of the shaft attachment portion, the inner peripheral surface with high accuracy can be molded by one shot without requiring a plurality of steps. In addition, by forming the undercut portion by plastic deformation, processing cost can be reduced as compared with the case of machining. As described above, the cost of the magnet holder can be reduced. Furthermore, by increasing the accuracy of the inner peripheral surface of the shaft attachment portion, it is easy to control a press-fitting margin when the shaft is press-fitted into the shaft attachment portion, and it is possible to improve attachment accuracy (coaxiality or the like) of the shaft to the magnet holder.

As the magnet holder described above, the magnet holding portion can be plastically deformed by a pressing force in an inner diameter direction acting on the magnet holding portion with sizing. By plastically deforming the magnet holding portion with the pressing force accompanying the sizing, it is possible to simultaneously perform the sizing of the inner peripheral surface of the shaft attachment portion and formation of the undercut portion. Therefore, productivity of the magnet holder can be improved.

As the magnet holder described above, a recess that engages with the magnet in a circumferential direction can be provided on an end surface on a magnet side of the shaft attachment portion. This makes it possible to prevent relative rotation of the magnet with respect to the magnet holder.

As the magnet holder described above, a groove portion can be provided on an inner peripheral surface of the shaft attachment portion, the groove portion extending in the axial direction and opening to an end surface of the shaft attachment portion on a side opposite to a side where the magnet is provided. Accordingly, the air inside the magnet holder can be released to the outside through the groove portion at the time of axial press-fitting, and it is possible to prevent breakage of the magnet holder and falling off the magnet from the magnet holder.

As the magnet holder described above, the undercut portion can be formed by a tapered surface.

As the magnet holder described above, the undercut portion can be formed by a projecting portion.

The magnet holder described above can be formed of an austenitic stainless steel material. This makes it possible to provide a magnet holder that does not affect the magnetic field of the magnet.

A magnet unit can include the magnet holder described above and a magnet held by a magnet holding portion of the magnet holder.

Advantageous Effects of Invention

In the present invention, the manufacturing cost of the magnet holder can be reduced.

BRIEF DESCRIPTION OF DRAWINGS

FIG. 5C is a cross-sectional view illustrating the sizing step.

DESCRIPTION OF EMBODIMENTS

Hereinafter, embodiments according to the present invention will be described with reference to the drawings.

Figure 1:
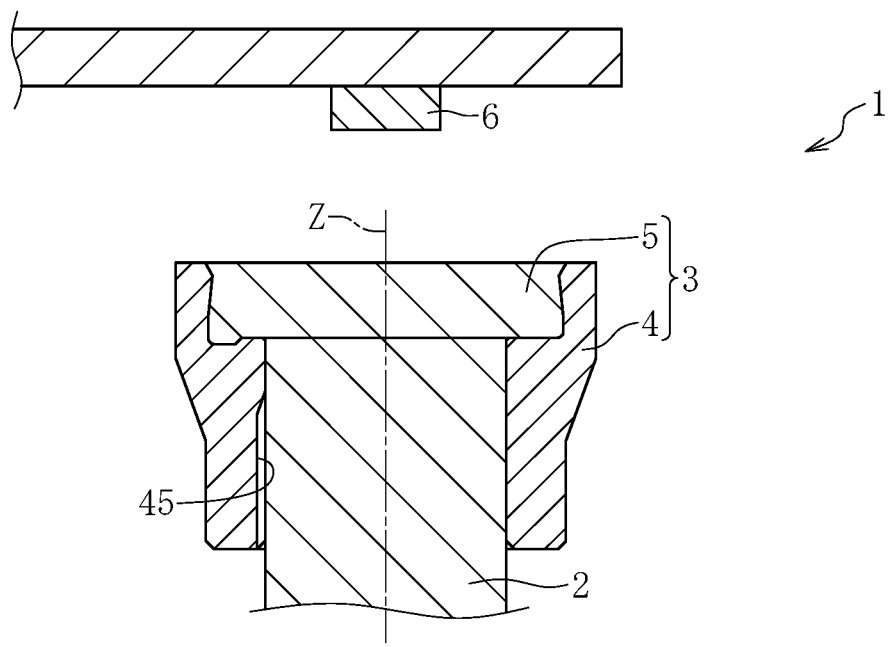
FIG. 1 is a cross-sectional view of a rotation angle detection device including a magnet unit according to an embodiment of the present invention.

As illustrated in FIG. 1, a rotation angle detection device 1 includes a magnet unit 3 and a magnetic sensor 6. The magnet unit 3 includes a magnet holder 4 and a magnet 5, and is attached to one axial end of a rotating shaft 2 that is a shaft.

The magnet holder 4 is formed of sintered metal by powder metallurgy, and is particularly formed of a non-magnetic material so as not to affect a magnetic field of the magnet 5. For example, it is preferable to select an austenitic stainless steel material that can be plastically deformed in a sizing step described later. The magnet 5 is a bonded magnet molded by injecting a magnetic material into the magnet holder 4 and magnetizing the magnetic material.

Figure 2A:
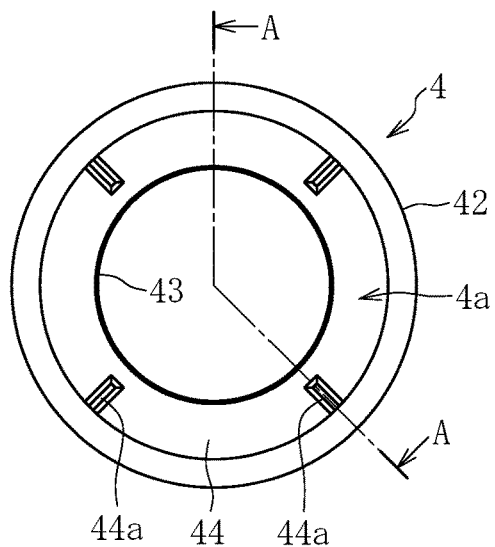
FIG. 2A is a plan view illustrating a magnet holder according to the embodiment.

The magnet holder 4 has a substantially cylindrical shape (see FIG. 2A), and one axial end side (upper side in FIG. 1) has a larger diameter than the other axial end side. The magnet holder 4 holds the magnet 5 on the one axial end side on an inner peripheral surface side thereof.

The magnet 5 has a configuration in which N poles and S poles are alternately arranged in a circumferential direction thereof, and changes the magnetic field to be formed by rotating integrally with the rotating shaft 2.

The magnetic sensor 6 is disposed to face the magnet 5, and can detect a change in magnitude or direction of the magnetic field formed by the magnet 5. A known magnetic sensor can be appropriately used for the magnetic sensor 6.

The rotating shaft 2 is provided to be rotatable about an axis Z. When the rotating shaft 2 rotates, the magnet unit 3 attached to one end side of the rotating shaft 2 rotates integrally with the rotating shaft 2. Thus, the magnitude or the direction of the magnetic field formed by the magnet 5 changes. Then, the magnetic sensor 6 can detect a rotation angle of the rotating shaft 2 by detecting this change. Hereinafter, an extending direction of the axis Z is also simply referred to as an axial direction.

Figure 2B:
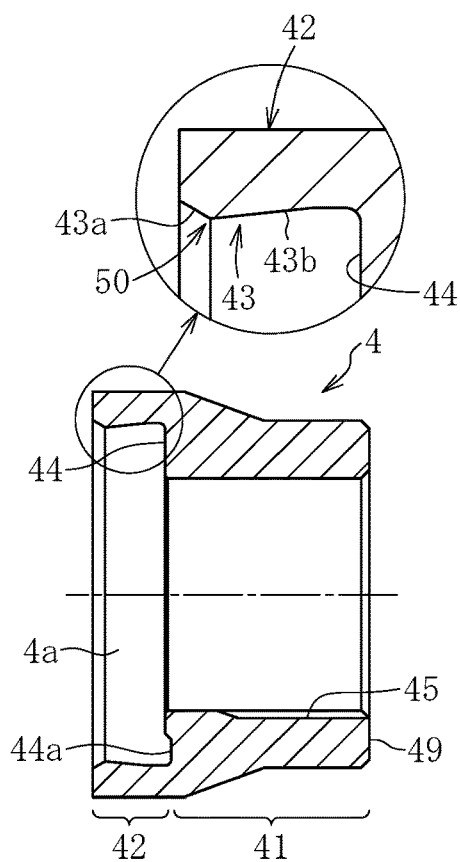
FIG. 2B is a cross-sectional view taken along a line A-A of FIG. 2A.

As illustrated in FIG. 2B, the magnet holder 4 has a configuration in which a hollow cylindrical shaft attachment portion 41 for press-fitting and fixing the rotating shaft 2 and a hollow cylindrical magnet holding portion 42 provided on one side in the axial direction of the shaft attachment portion 41 and holding a periphery of the magnet 5 are integrated. An inner peripheral space of the shaft attachment portion 41 and an inner peripheral space of the magnet holding portion 42 are continuous in the axial direction. An inner peripheral surface (inner side surface) 43 of the magnet holding portion 42 faces the periphery of the magnet 5, and an inner diameter dimension of the inner peripheral surface 43 is larger than an inner diameter dimension of an inner peripheral surface of the shaft attachment portion 41. A magnet housing portion 4a, which is a space for housing the magnet 5, is formed by a magnet-side end surface 44 of the shaft attachment portion 41 facing an end surface of the magnet 5 and the inner peripheral surface 43 of the magnet holding portion 42.

As illustrated in a partially enlarged view of FIG. 2B, a tapered portion 43a and a reverse tapered portion 43b are continuously provided on the inner peripheral surface 43 of the magnet holding portion 42 from the one side in the axial direction. The tapered portion 43a is a portion having a diameter decreasing from the one side to the other side in the axial direction. Further, the reverse tapered portion 43b is a portion having a diameter increasing from the one side to the other side in the axial direction, and an undercut portion 50 is formed by the tapered portion 43a and the reverse tapered portion 43b.

Figure 3:
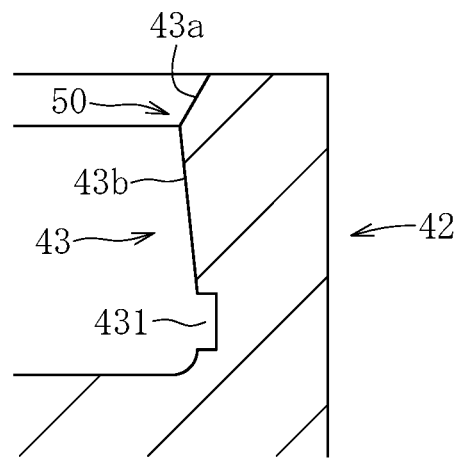
FIG. 3 is a cross-sectional view illustrating a recess having a configuration different from that of the embodiment.

The end surface 44 of the shaft attachment portion 41 is provided with a recess 44a for preventing rotation of the magnet 5 with respect to the magnet holder 4. At least one recess 44a may be provided, and in the present embodiment, four recesses 44a are provided at equal intervals in the circumferential direction. However, a position where the recess for preventing the rotation of the magnet 5 is provided is not limited to the end surface 44. For example, as illustrated in FIG. 3, a recess 431 may also be provided in the reverse tapered portion 43. At least one recess 431 may be provided, and for example, four recesses 431 can be provided at equal intervals in the circumferential direction.

A groove portion 45 extending in the axial direction is provided on the inner peripheral surface of the shaft attachment portion 41. The groove portion 45 is provided in a partial region in the circumferential direction and is open to the other axial side of the shaft attachment portion 41. In the magnet holder 4, the rotating shaft 2 is press-fitted into the shaft attachment portion 41 in a state where the magnet 5 is held by the magnet holding portion 42, so that a sealed space is formed in the magnet holder 4. On the other hand, by providing the groove portion 45 open to the other axial side, an inside and an outside of the magnet holder 4 communicate with each other via the groove portion 45, so that the air in the magnet holder 4 can be released to the outside along with press-fitting. Thus, it is possible to prevent the magnet 5 from being detached or the magnet unit 3 from being damaged due to increase in internal pressure of the magnet holder 4 during the press-fitting of the rotating shaft 2.

Next, a method for producing the magnet unit 3 will be described.

In the present embodiment, the magnet holder 4 is molded by powder metallurgy. That is, metal powder is compression-molded with a molding die, and then a green compact thus obtained is heated and sintered to obtain a sintered body. Then, dimensions of the sintered body are corrected by sizing to complete the magnet holder 4.

Figure 4:
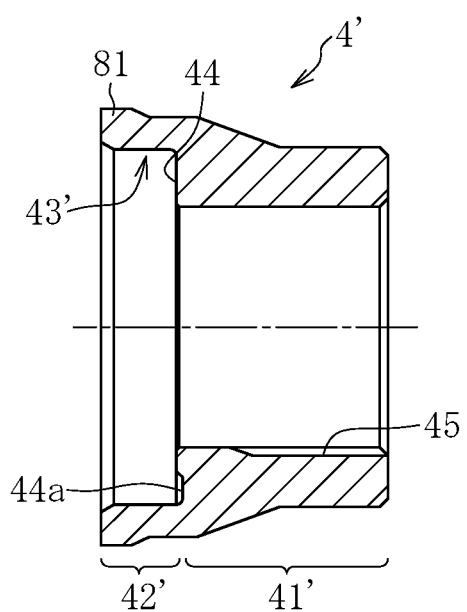
FIG. 4 is a cross-sectional view illustrating a sintered body which is an intermediate molded product of the magnet holder of FIG. 2.

A sintered body 4' of the present embodiment obtained in the above process is illustrated in FIG. 4.

A portion 41' corresponding to the shaft attachment portion 41 (including the recess 44a and the groove portion 45) and a portion 42' corresponding to the magnet holding portion 42 are formed in the sintered body 4'. An outer diameter dimension of the portion (hereinafter, referred to as a "shaft attachment portion-corresponding portion") 41' corresponding to the shaft attachment portion 41 and an outer diameter dimension of the portion (hereinafter, referred to as a "magnet holding portion-corresponding portion") 42' corresponding to the magnet holding portion 42 are respectively larger than those of the shaft attachment portion 41 and the magnet holding portion 42 by a sizing margin. A shape of a magnet holding portion-corresponding portion 42' is different from that of the magnet holding portion 42. That is, an inner peripheral surface 43' of the magnet holding portion-corresponding portion 42' is formed in a cylindrical surface shape having a uniform diameter, and the undercut portion 50 illustrated in FIG. 2B does not exist in the inner peripheral surface 43'. In addition, an annular protrusion 81 is formed in a region on the one side in the axial direction of an outer peripheral surface of the magnet holding portion-corresponding portion 42'. A sizing margin of an outer peripheral surface of the protrusion 81 is larger than that of an outer peripheral surface of the other region of the magnet holder 4.

Subsequently, by sizing the sintered body 4', dimensional accuracy of each part is improved, and the undercut portion 50 is formed to obtain the magnet holder 4.

Figure 5A:
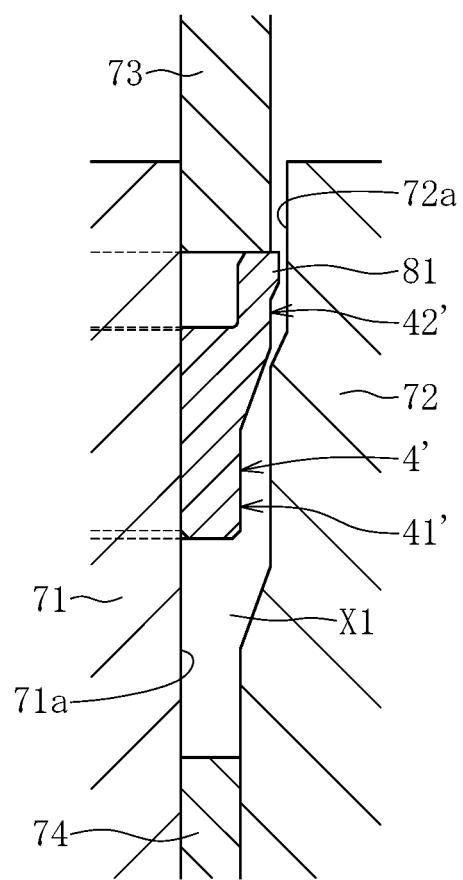
FIG. 5A is a cross-sectional view illustrating a sizing step.

Specifically, first, as illustrated in FIG. 5A, the sintered body 4' is inserted into an annular cavity X1 formed between an annular core 71 and a die 72. Note that although only one cross-section in the circumferential direction of the sintered body 4' is illustrated in FIGS. 5A to 5C, the entire sintered body 4' is inserted into the annular cavity X1.

The core 71 has a constant outer diameter in the axial direction, and an outer peripheral surface 71a thereof is formed in a cylindrical surface shape. On the other hand, a diameter of an inner peripheral surface 72a of the die 72 is gradually reduced from an upper side to a lower side in the drawing, and has a plurality of stepped surfaces. That is, a width of the cavity X1 is reduced from the upper side to the lower side in the drawing, and a sufficient width for inserting the sintered body 4' is provided at an upper end thereof.

The sintered body 4' inserted into the cavity X1 is pushed down by an upper punch 73 (FIG. 5A), pressed by the upper punch 73 and a lower punch 74 (FIG. 5B), and then removed from a mold by raising the upper punch 73 and the lower punch 74 (FIG. 5C).

Figure 5B:
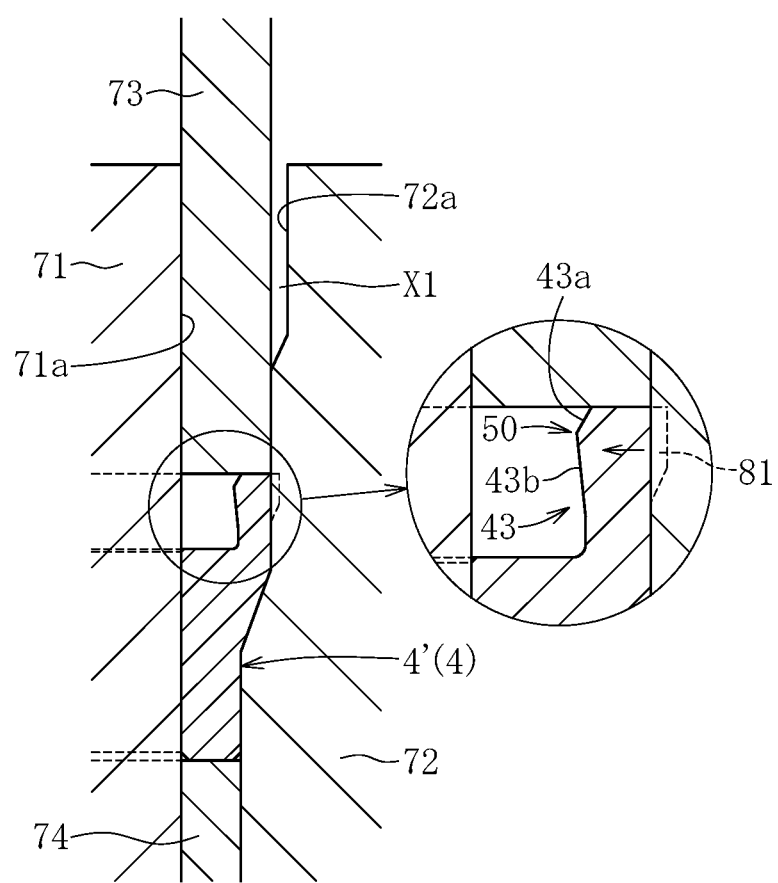
FIG. 5B is a cross-sectional view illustrating the sizing step.

In a process from FIG. 5A to FIG. 5B, the sintered body 4' is compressed by receiving a pressing force in an inner diameter direction from the die 72. By this pressing force, an inner peripheral surface of the sintered body 4' is reduced in diameter and pressed against the core 71. Therefore, an outer peripheral surface of the sintered body 4' is molded by the inner peripheral surface 72a of the die 72, and an inner peripheral surface of the shaft attachment portion-corresponding portion 41' of the sintered body 4' is molded by the outer peripheral surface 71a of the core 71. Further, both end faces of the sintered body 4' are formed by the upper punch 73 and the lower punch 74.

As described above, the sizing margin on the outer peripheral surface of the sintered body 4' is the largest at the protrusion 81. Further, as illustrated in FIGS. 5A and 5B, there is a space between the magnet holding portion-corresponding portion 42' of the sintered body 4' and the core 71, and the magnet holding portion-corresponding portion 42' that receives the pressing force from the die 72 toward the inner diameter side is in a state of being freely deformable toward the inner diameter side. Therefore, when the protrusion 81 is compressed, an inner peripheral surface of the protrusion 81 protrudes toward the inner diameter side by plastic flow in the inner diameter direction. Thus, as illustrated in an enlarged view of FIG. 5B, the undercut portion 50 including the tapered portion 43a and the reverse tapered portion 43b is formed on the inner peripheral surface 43 of the magnet holding portion 42.

Thus, sizing of the inner peripheral surface of the shaft attachment portion 41 and formation of the undercut portion 50 can be simultaneously performed in one shot.

Note that during this sizing, the outer peripheral surfaces of the shaft attachment portion 41 and the magnet holding portion 42 are subjected to a compression operation while sliding on the die 72, so that vacancies are crushed on the outer peripheral surfaces. On the other hand, the inner peripheral surface 43 of the magnet holding portion 42 does not slide on the mold and is not subjected to the compression operation, so that almost no vacancy is crushed on the inner peripheral surface 43. Therefore, a vacancy rate of the inner peripheral surface of the magnet holding portion 42 is larger than that of the outer peripheral surfaces of the shaft attachment portion 41 and the magnet holding portion 42. The vacancy rate is represented by an area ratio occupied by the vacancies when a micrograph of a surface is subjected to image analysis.

Then, using the removed magnet holder 4 as a part of the molding die, the magnet housing portion 4a (see FIG. 2) is filled with the magnetic material, and a magnet material is injection-molded. At this time, a surface on the one side in the axial direction of the magnet material is present in a region of the tapered portion 43a. Thereafter, the magnet 5 can be obtained by magnetizing the magnet material by an appropriate means. In addition, at the time of injection molding, the recess 44a (see FIG. 2B) is filled with the magnetic material, so that a protrusion that comes into close contact with the recess 44a and engages with the recess 44a in the circumferential direction is formed in the magnet 5. As described above, by providing the recess 44a in the magnet holder 4, the protrusion can be formed in the magnet 5 by subsequent injection molding, and a rotation stopping mechanism of the magnet 5 can be provided with a simple configuration.

As described above, as illustrated in FIG. 1, the magnet unit 3 in which magnet 5 and magnet holder 4 are integrated is completed.

The magnet 5 has a linear expansion coefficient larger than that of the magnet holder 4 formed of sintered metal. Therefore, when the injection-molded magnet 5 is cooled and contracted, there is a possibility that looseness may occur between the magnet 5 and the magnet holder 4 or the magnet 5 may fall off the magnet holder 4. However, in the present embodiment, the undercut portion 50 is provided on the inner peripheral surface 43 of the magnet holding portion 42, and the undercut portion 50 is formed over the undercut portion 50 and an upper part of the undercut portion 50 to be in close contact with the magnet 5, so that the magnet 5 is restrained by the magnet holder 4, and an axial movement of the magnet 5 with respect to the magnet holder 4 is restricted. Therefore, it is possible to prevent the magnet 5 from falling off the magnet holder 4. In addition, the looseness of the magnet 5 in the magnet holder 4 mainly in the axial direction can be suppressed, and detection accuracy of the rotation angle by the rotation angle detection device 1 can be improved.

In the present embodiment, the magnet holding portion 42 and shaft attachment portion 41 are integrally formed of sintered metal. Since the sintered metal is rich in plastic fluidity, and high surface accuracy can be obtained by sizing, by sizing the inner peripheral surface of the shaft attachment section 41 made of sintered metal, the inner peripheral surface with high accuracy can be formed in one shot without requiring a plurality of machining steps. Further, by forming the undercut portion 50 by plastic deformation, processing cost can be reduced. From the above, it is possible to reduce the cost of the magnet holder 4. By increasing the accuracy of the inner peripheral surface of the shaft attachment portion 41 by sizing, it is easy to control a press-fitting margin when the rotating shaft 2 is press-fitted into the shaft attachment portion 41, and it is possible to improve attachment accuracy (coaxiality or the like) of the rotating shaft 2 to the magnet holder 4. In addition, since the undercut portion 50 is formed by plastically deforming the magnet holding portion 42 by the pressing force in the inner diameter direction acting on the magnet holding portion 42 with the sizing, it is possible to simultaneously correct the dimensional accuracy with respect to the inner peripheral surface of the shaft attachment portion 41 and form the undercut portion 50, and it is possible to improve productivity of the magnet holder 4.

Further, in the present embodiment, since the protrusion of the magnet 5 is fitted into the plurality of recesses 44a provided in the circumferential direction of the magnet holder 4, it is possible to prevent the rotation of the magnet 5 in the circumferential direction with respect to the magnet holder 4. Thus, the detection accuracy of the rotation angle by the rotation angle detection device 1 can be improved.

Next, the magnet unit having the magnet holder according to another embodiment will be described with reference to FIGS. 6A and 6B. Hereinafter, description of configurations similar to those of the above embodiment will be appropriately omitted.

Figure 6A:
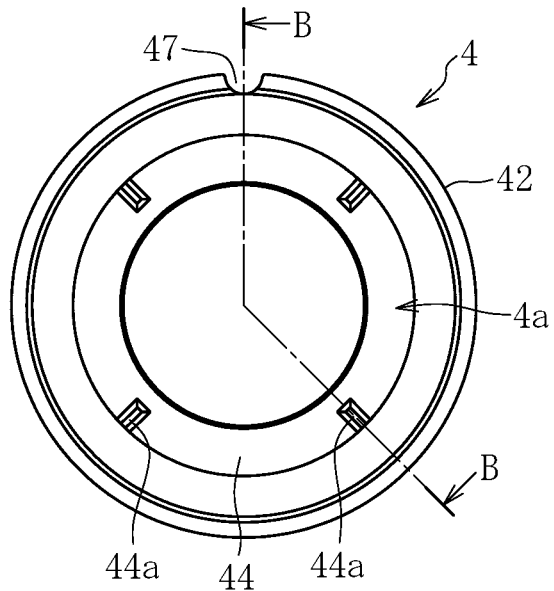
FIG. 6A is a plan view illustrating the magnet holder according to another embodiment.
Figure 6B:
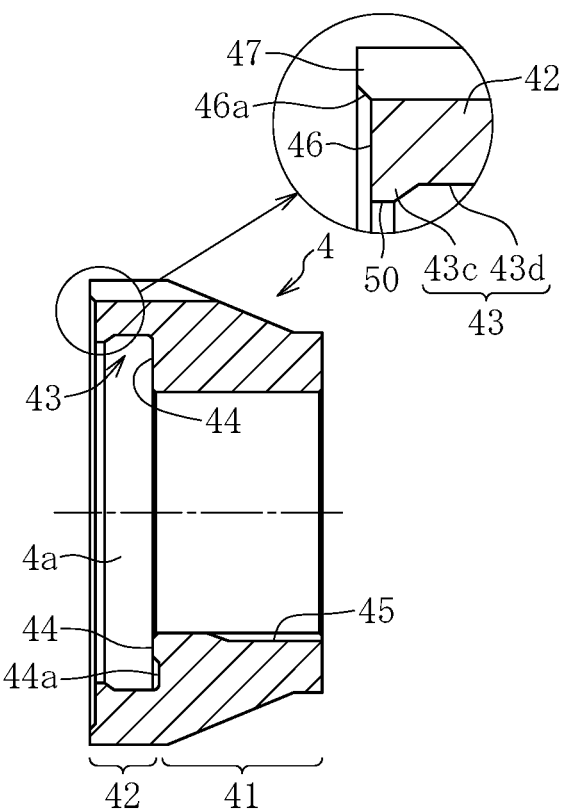
FIG. 6B is a cross-sectional view taken along a line B-B of FIG. 6A.

As illustrated in an enlarged view of FIG. 6B, in the magnet holder 4 of the present embodiment, the inner peripheral surface 43 forming the magnet holding portion 42 is constituted by a projecting portion 43c provided on the one side in the axial direction and projecting in the inner diameter direction, and a flat surface 43d provided on the other side in the axial direction continuously to the projecting portion 43c and having a uniform diameter. This projecting portion 43c forms the undercut portion 50 on the inner peripheral surface 43 of the magnet holding portion 42.

An end surface 46 of the magnet holding portion 42 is formed in a stepped flat surface shape. The end surface 46 is provided one step lower than an end surface on an outer diameter side thereof (retreated in a right direction in FIG. 6B), and these end surfaces are connected by a tapered surface 46a.

As illustrated in FIG. 6A, a groove portion 47 extending in the axial direction is provided in a partial region in the circumferential direction of the magnet holder 4 in a region from the outer peripheral surface of the magnet holding portion 42 to the outer peripheral surface of the shaft attachment portion 41. The groove portion 47 identifies a circumferential position of the magnet holder 4, and is used to determine a magnetization direction. However, it is sufficient that a shape of this portion can be determined from the outside, and for example, the groove portion 47 can be a cutout or a recess having a specific shape.

Next, a process of producing the magnet holder 4 of the present embodiment will be described.

In the same manner as in the above-described embodiment, the metal powder is compression-molded with the molding die, and then the green compact thus obtained is heated and sintered to obtain the sintered body 4'.

Figure 7:
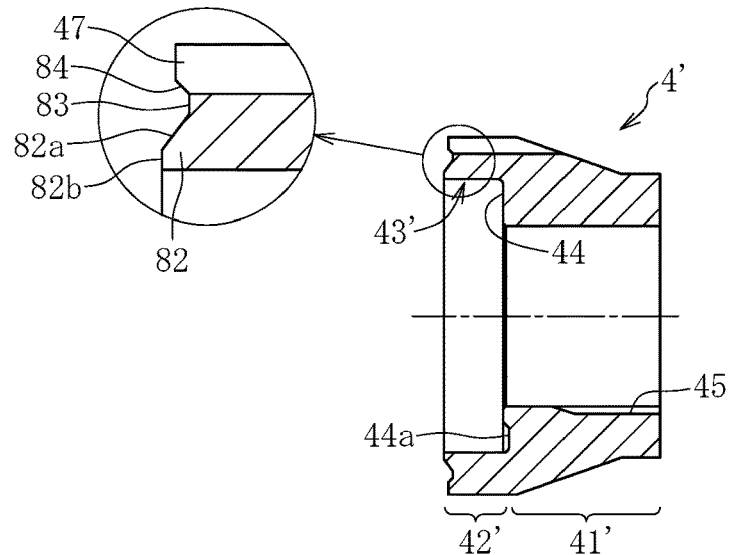
FIG. 7 is a cross-sectional view illustrating the sintered body which is the intermediate molded product of the magnet holder of FIG. 6.

As illustrated in FIG. 7, in the sintered body 4' of the present embodiment, the inner peripheral surface of the magnet holding portion-corresponding portion 42' is formed in a cylindrical surface shape with a constant diameter. On the inner diameter side of the end surface of the magnet holding portion-corresponding portion 42', as illustrated in an enlarged view of FIG. 7, a protrusion 82 protruding to the one side in the axial direction is formed. An end surface of an inner diameter end of the protrusion 82 is a flat surface 82b, and an inclined surface 82a having an inclination angle (inclination angle with respect to a radial direction) of 45° or less is provided on an outer diameter side thereof. In addition, a flat surface 83 is formed on the outer diameter side of the inclined surface 82a, and a tapered surface 84 having an inclination angle (same as above) of 90° or less is provided on the outer diameter side of the flat surface 83. When the inclination angle of the inclined surface 82a exceeds 45°, it is difficult to plastically deform the protrusion 82 during sizing. In addition, when the inclination angle of the tapered surface 84 exceeds 90°, the tapered surface 84 is undercut, so that the molding is difficult. Therefore, by setting angles as described above, moldability of the magnet holder 4 is secured.

Next, a process of sizing the sintered body 4' and molding the magnet holder 4 will be described.

Figure 8A:
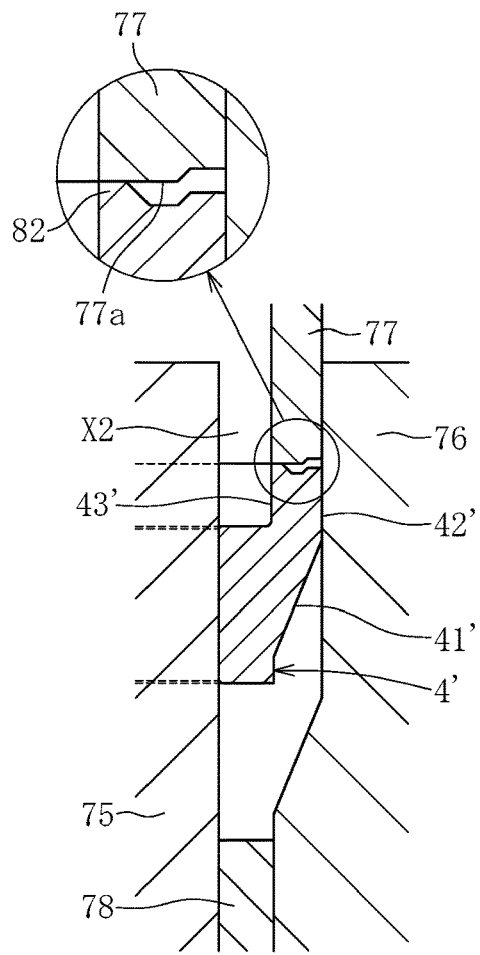
FIG. 8A is a cross-sectional view illustrating the sizing step.

As illustrated in FIG. 8A, the sintered body 4' is inserted into an annular cavity X2 formed between an annular core 75 and a die 76.

Figure 8B:
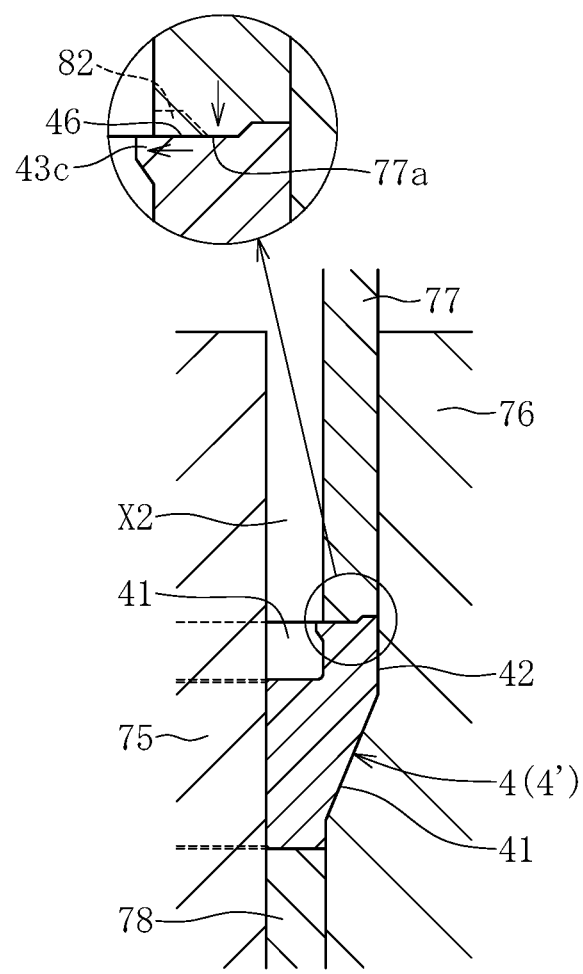
FIG. 8B is a cross-sectional view illustrating the sizing step.
Figure 8C:
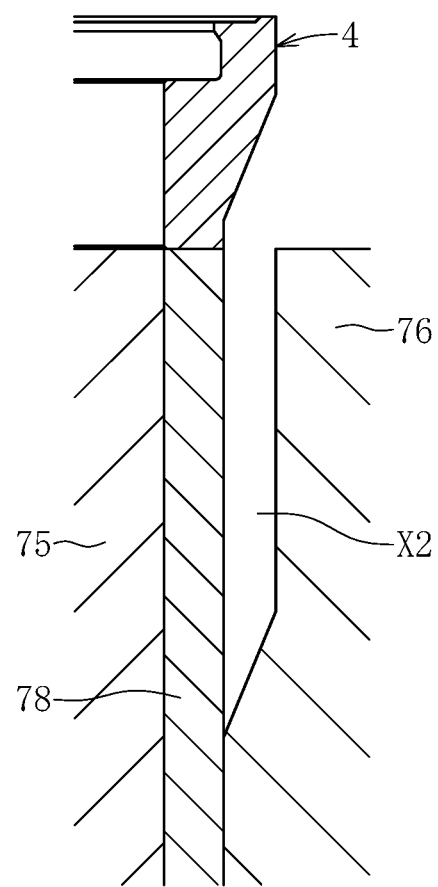
FIG. 8C is a cross-sectional view illustrating the sizing step.

The sintered body 4' inserted into the cavity X2 is pushed down by an upper punch 77 (FIG. 8A), pressed by the upper punch 77 and a lower punch 78 (FIG. 8B), and then removed from the mold by raising the upper punch 77 and the lower punch 78 (FIG. 8C).

The sizing step illustrated in FIGS. 8A to 8C is basically common to the sizing step illustrated in FIGS. 5A to 5C. Therefore, description of common parts is omitted, and different parts will be described below.

In this sizing step, as illustrated in an enlarged view of FIG. 8A, an inner diameter side of an end surface 77a of the upper punch 77 for molding the end surface of the magnet holding portion 42 has a shape protruding downward in the drawing from an outer diameter side thereof. Therefore, on the end surface of the magnet holding portion-corresponding portion 42' of the sintered body 4', the protrusion 82 has the maximum sizing margin. An inner diameter side of the protrusion 82 is a gap without the mold, so that an inner peripheral surface 43' of the magnet holding portion-corresponding portion 42' can be freely deformed. By pressurizing the protrusion 82 in the axial direction in an inner diameter side region of the end surface of the upper punch 77, a thickness of the convex portion 82 plastically flows to the inner diameter side, and as illustrated in the enlarged view of FIG. 8B, the projecting portion 43c is formed on the inner peripheral surface 43 of the magnet holding portion 42. In addition, a region where the protrusion 82 is present becomes a flat surface, and the end surface 46 of the magnet holding portion 42 is molded.

Also in the present embodiment, the outer peripheral surfaces of the shaft attachment portion 41 and the magnet holding portion 42 slide on the die 76 and are compressed, whereas the inner peripheral surface of the magnet holding portion 42 is not in contact with the mold, so that the vacancy rate of the inner peripheral surface 43 of the magnet holding portion 42 is larger than that of the outer peripheral surfaces of the shaft attachment portion 41 and the magnet holding portion 42.

Figure 9:
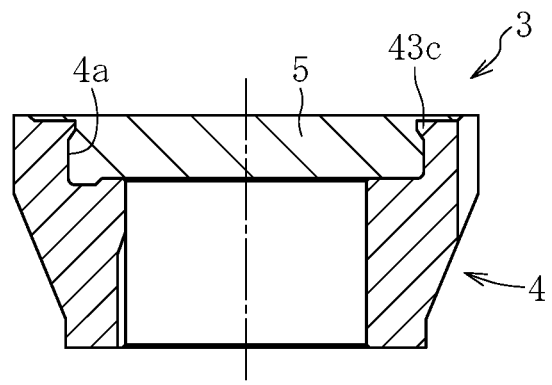
FIG. 9 is a cross-sectional view illustrating the magnet unit according to the other embodiment.
Figure 10:
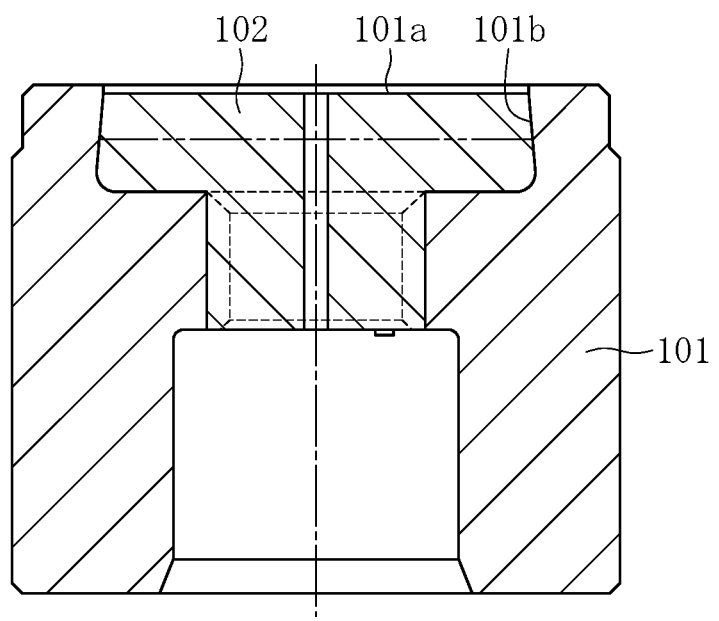
FIG. 10 is a cross-sectional view illustrating a conventional rotation angle detection device.

Thereafter, the magnet 5 is formed in the magnet housing portion 4a by the same process as the above-described embodiment using the removed magnet holder 4 as the molding die. Thus, as illustrated in FIG. 9, magnet unit 3 in which magnet holder 4 and magnet 5 are integrated is formed. Note that the surface on the one side in the axial direction of the magnet 5 is present in a region of the tapered surface 46a.

In the present embodiment, since the magnet 5 is in close contact with the projecting portion 43c serving as the undercut portion, when the magnet 5 contracts, the looseness of the magnet 5 with respect to the magnet holder 4 can be suppressed, and the magnet 5 can be prevented from falling off the magnet holder 4.

Next, the magnet unit having the magnet holder according to still another embodiment will be described with reference to FIGS. 11A and 11B. Hereinafter, description of configurations similar to those of the above embodiment will be appropriately omitted.

Figure 11A:
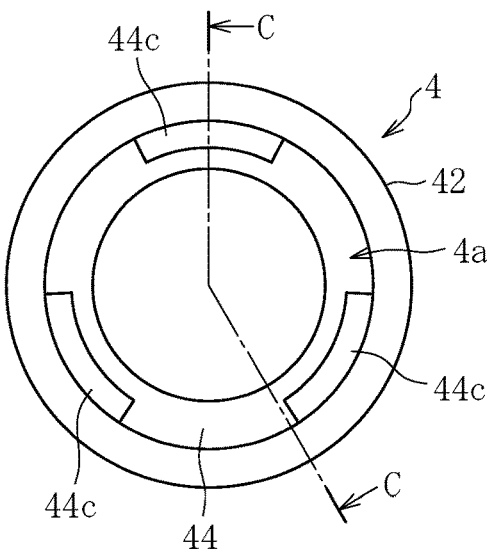
FIG. 11A is a plan view illustrating the magnet holder according to still another embodiment.
Figure 11B:
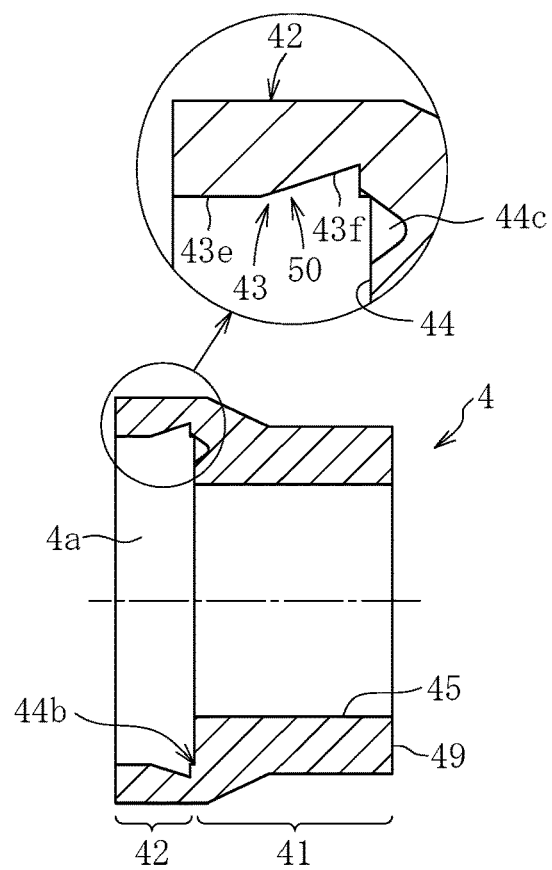
FIG. 11B is a cross-sectional view taken along a line C-C of FIG. 11A.

As illustrated in an enlarged view of FIG. 11B, in the magnet holder 4 of the present embodiment, the inner peripheral surface 43 forming the magnet holding portion 42 is constituted by a flat surface 43e provided on the one side in the axial direction and having a substantially constant diameter, and a reverse tapered portion 43f provided continuously to the flat surface 43e and on the other side in the axial direction. The reverse tapered portion 43f is an inclined surface having a diameter decreasing from the one side to the other side in the axial direction. The undercut portion 50 is formed on the inner peripheral surface 43 of the magnet holding portion 42 by the reverse tapered portion 43f.

A stepped portion 44b is provided on the end surface 44 of the shaft attachment portion 41. Due to the stepped portion 44b, a radially inner side of the end surface 44 is lower than a radially outer side thereof by one step.

As illustrated in FIG. 11A, the end surface 44 of the shaft attachment portion 41 is provided with recesses 44c extending in the circumferential direction. Three recesses 44c are provided at equal intervals in the circumferential direction. Since the protrusion of the magnet is fitted into the recesses 44c, it is possible to prevent the rotation of the magnet in the circumferential direction with respect to the magnet holder. Since a plurality of recesses 44c are formed in the circumferential direction, a pressure applied to the recesses 44c can be dispersed when the rotation of the magnet is prevented. In particular, by arranging the recesses 44c at equal intervals, the pressure applied to the recesses 44c can be uniformly dispersed.

Next, a process of producing the magnet holder 4 of the present embodiment will be described.

In the same manner as in the above-described embodiment, the metal powder is compression-molded with the molding die, and then the green compact thus obtained is heated and sintered to obtain the sintered body 4'.

Figure 12:
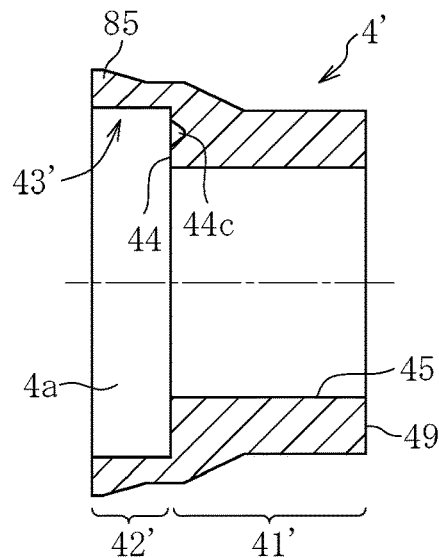
FIG. 12 is a cross-sectional view illustrating the sintered body which is the intermediate molded product of the magnet holder of FIG. 11.

As illustrated in FIG. 12, in the sintered body 4' of the present embodiment, the inner peripheral surface of the magnet holding portion-corresponding portion 42' is formed in a cylindrical surface shape with a constant diameter. Further, on an outer peripheral surface side of the magnet holding portion-corresponding portion 42', a protrusion 85 protruding to the outer diameter side is provided, and an outer dimension of the magnet holding portion-corresponding portion 42' is increased by the sizing margin. The protrusion 85 has an inclined surface having a diameter decreasing from the one side to the other side in the axial direction on an outer peripheral surface side thereof. Further, the end surface 44 of the shaft attachment portion-corresponding portion 41' is not provided with a stepped portion and has a flat surface shape.

Next, a process of sizing the sintered body 4' and molding the magnet holder 4 will be described.

Figure 13A:
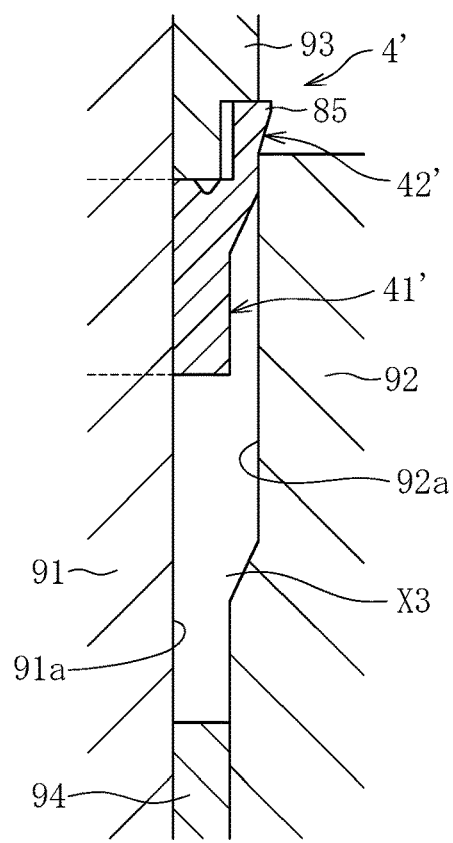
FIG. 13A is a cross-sectional view illustrating the sizing step.

As illustrated in FIG. 13A, the sintered body 4' is inserted into an annular cavity X3 formed between an annular core 91 and a die 92.

Figure 13B:
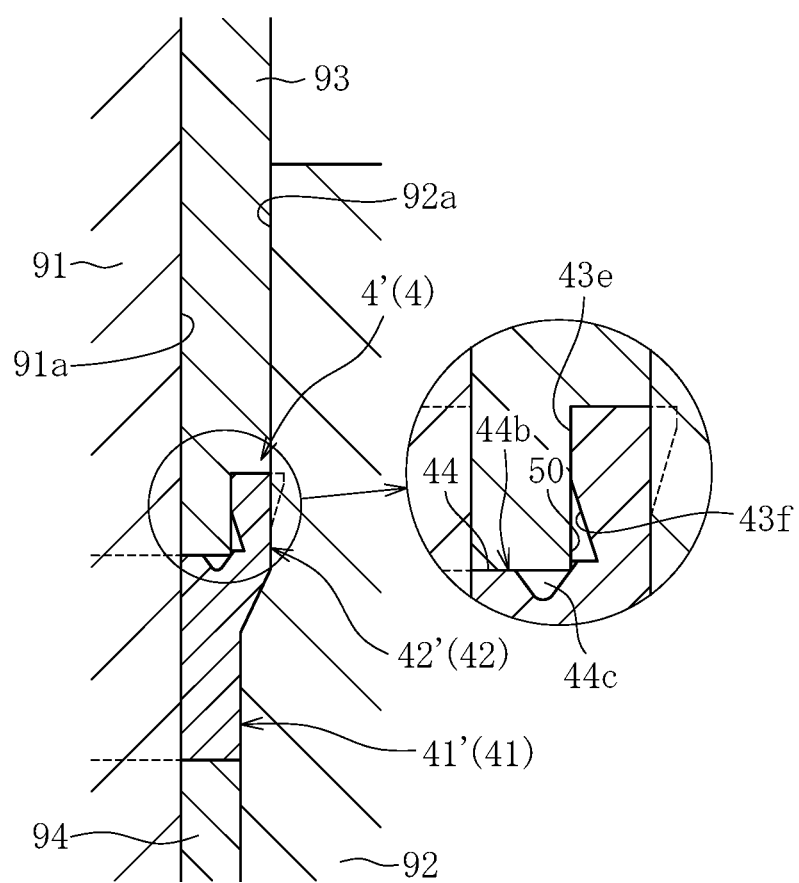
FIG. 13B is a cross-sectional view illustrating the sizing step.
Figure 13C:
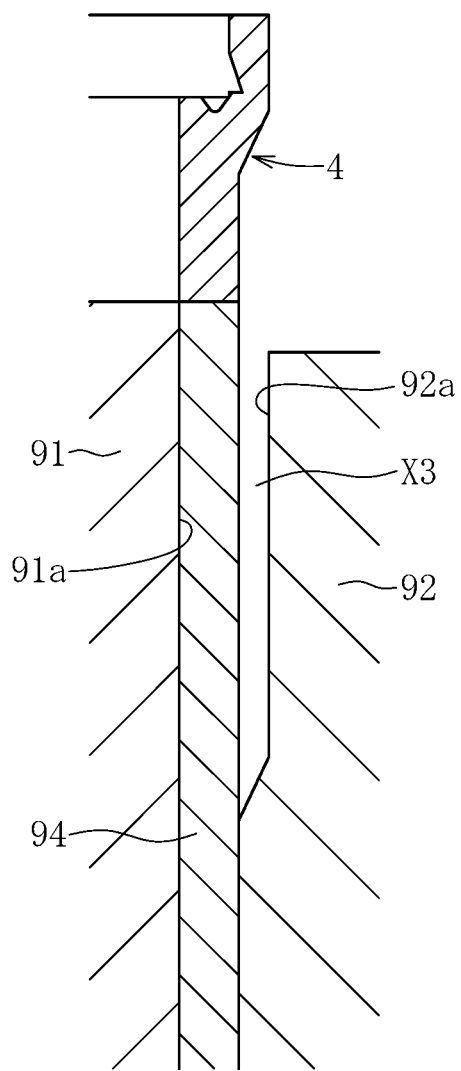
FIG. 13C is a cross-sectional view illustrating the sizing step.

The sintered body 4' inserted into the cavity X3 is pushed down by the upper punch 93 (FIG. 13A), pressed by the upper punch 93 and a lower punch 94 (FIG. 13B), and then removed from the mold by raising the upper punch 93 and the lower punch 94 (FIG. 13C).

The sizing step illustrated in FIGS. 13A to 13C is basically common to the sizing step illustrated in FIGS. 5A to 5C. Therefore, description of common parts is omitted, and different parts will be described below.

In a process from FIG. 13A to FIG. 13B, an inner peripheral surface 92a of the die 92 generates a pressing force toward the inner peripheral surface side in the protrusion 85 which is the outer peripheral surface side of the magnet holding portion-corresponding portion 42'. This pressing force causes the plastic flow toward the inner diameter side, and as illustrated in an enlarged view of FIG. 13B, the outer peripheral surface side of the magnet holding portion-corresponding portion 42' is formed in a flat surface along the inner peripheral surface 92a of the die 92, and a material on the protrusion 85 side projects toward the inner diameter side. At this time, the one side in the axial direction (upper side in the drawing) having a large thickness projects to a position in contact with an outer peripheral surface of the upper punch 93, and an amount of projection is reduced toward the other side in the axial direction. Therefore, the flat surface 43e and the reverse tapered portion 43f are formed on the inner peripheral surface side of the magnet holding portion-corresponding portion 42'.

Further, in the process from FIG. 13A to FIG. 13B, a part of the inner diameter side of the end surface 44 of the shaft attachment portion-corresponding portion 41' is pressed by the upper punch 93 to be recessed, and the stepped portion 44b is formed on the end surface 44. In addition, since the end surface 44 is pressed by the upper punch 93 in this manner, the pressed portion can be flattened.

Also in the present embodiment, the outer peripheral surfaces of the shaft attachment portion 41 and the magnet holding portion 42 slide on the die 92 and are compressed, whereas the inner peripheral surface of the magnet holding portion 42 is not in contact with the mold, so that the vacancy rate of the inner peripheral surface 43 of the magnet holding portion 42 is larger than that of the outer peripheral surfaces of the shaft attachment portion 41 and the magnet holding portion 42.

Also in the present embodiment, since the magnet 5 is in close contact with the reverse tapered portion 43f serving as the undercut portion, when the magnet 5 contracts, the looseness of the magnet 5 with respect to the magnet holder 4 can be suppressed, and the magnet 5 can be prevented from falling off the magnet holder 4.

Note that the undercut portions 50 (the reverse tapered portion 43b and 43f, and the projecting portion 43c) are formed to prevent the magnet holder 4 from coming off as described above, and does not require strict dimensional accuracy. Therefore, they can be formed by the sizing step as described above. Therefore, as illustrated in FIGS. 5A, 8A, and 13A, the undercut portion 50 satisfying required functions can be formed even when the inner diameter side of the magnet holding portion-corresponding portion 42' is not constrained by the mold and is freely plastically deformable.

Although the embodiments of the present invention have been described above, the present invention is not limited to the above-described embodiments, and it is obvious that various modifications can be made without departing from the gist of the present invention.

REFERENCE SIGNS LIST

1 Rotation angle detection device
2 Rotating shaft (Shaft)
3 Magnet unit
4 Magnet holder
4a Magnet housing portion
41 Shaft attachment portion
42 Magnet holding portion
43 Inner peripheral surface (Inner side surface)
43a Tapered portion
43b Reverse tapered portion
43c Projecting portion
43f Reverse tapered portion
44 End surface
44a, 44b Recess
45 Groove portion
50 Undercut portion
4' Sintered body
81, 82, 85 Protrusion
5 Magnet
6 Magnetic sensor
X1, X2, X3 Cavity

The invention claimed is:

1. A magnet holder comprising:
a cylindrical body defining opposing inner and outer peripheral surfaces and having opposing axial ends;
a shaft attachment portion disposed within one axial end of the cylindrical body to which a shaft is press-fitted and fixed; and
a magnet holding portion disposed within the other axial end of the cylindrical body opposite the shaft attachment portion and that holds a periphery of a magnet, the magnet holding portion comprising a space defined by an inner peripheral surface of the magnet holding portion and a radially-extending end surface of the shaft attachment portion on a magnet side thereof, the magnet holding portion being provided with a circumferentially-extending undercut portion that engages with the magnet in an axial direction on the inner peripheral surface of the magnet holding portion facing the magnet to prevent relative axial movement therebetween, wherein:
the magnet holding portion and the shaft attachment portion are integrally formed of sintered metal;
an outer peripheral surface and an end surface of the magnet holding portion and an inner peripheral surface of the shaft attachment portion are sized;
the undercut portion is formed by plastic deformation of the magnet holding portion by a pressing force in an inner diameter direction generated by pressurizing an outer circumferential surface of the magnet holding portion during the sizing;
the inner peripheral surface of the magnet holding portion has a circumferentially-extending tapered surface and a circumferentially-extending reverse tapered surface that continues from the circumferentially-extending tapered surface on a shaft attachment portion side;
the circumferentially-extending tapered surface is inclined toward an inner diameter side of the magnet holding portion as the circumferentially-extending tapered surface approaches the shaft attachment portion;
the circumferentially-extending reverse tapered surface is inclined toward an outer diameter side of the magnet holding portion as the circumferentially-extending reverse tapered surface approaches the shaft attachment portion;
the undercut portion is formed by the circumferentially-extending reverse tapered surface; and
a recess that engages with the magnet in a circumferential direction is provided on the radially-extending end surface on the magnet side of the shaft attachment portion to prevent relative rotation therebetween.

2. The magnet holder according to claim 1, wherein a groove portion is provided on the inner peripheral surface of the shaft attachment portion, the groove portion extending in the axial direction and opening to an end surface of the shaft attachment portion on a side opposite to the magnet side the magnet is provided.

3. The magnet holder according to claim 1, wherein the magnet holder is formed of an austenitic stainless steel material.

4. A magnet unit comprising:
the magnet holder according to claim 1; and
a magnet held by the magnet holding portion of the magnet holder.

5. The magnet holder according to claim 3, wherein a groove portion is provided on the inner peripheral surface of the shaft attachment portion, the groove portion extending in the axial direction and opening to an end surface of the shaft attachment portion on a side opposite to the magnet side.

\* \* \* \* \*